(No Model.) 2 Sheets—Sheet 1.
F. H. RICHARDS.
SPRING WHEEL FOR VEHICLES.

No. 560,648. Patented May 26, 1896.

Witnesses:
John L. Edwards Jr.
Fred. J. Dole.

Inventor:
F. H. Richards.

(No Model.) 2 Sheets—Sheet 2.
F. H. RICHARDS.
SPRING WHEEL FOR VEHICLES.
No. 560,648. Patented May 26, 1896.
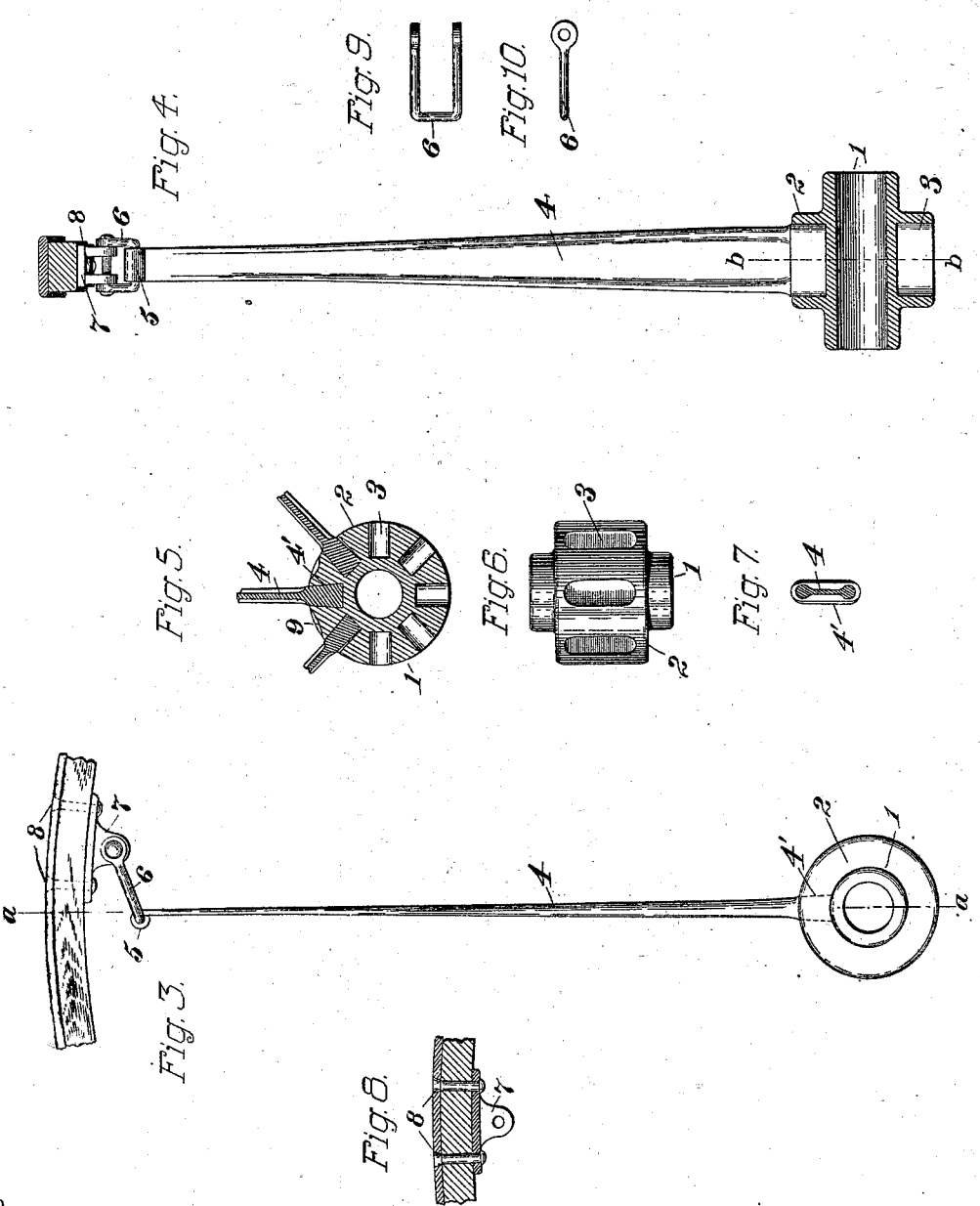
Witnesses:
John L. Edwards Jr.
Fred. J. Dole.
Inventor:
F. H. Richards.

UNITED STATES PATENT OFFICE.

FRANCIS H. RICHARDS, OF HARTFORD, CONNECTICUT.

SPRING-WHEEL FOR VEHICLES.

SPECIFICATION forming part of Letters Patent No. 560,648, dated May 26, 1896.

Application filed January 14, 1896. Serial No. 575,432. (No model.)

*To all whom it may concern:*

Be it known that I, FRANCIS H. RICHARDS, a citizen of the United States, residing at Hartford, in the county of Hartford and State of Connecticut, have invented certain new and useful Improvements in Spring-Wheels for Vehicles, of which the following is a specification.

This invention relates to what are known in the art as "spring-wheels for vehicles;" and it comprises in the preferred form thereof herein shown and described a hub of peculiar construction and spokes of resilient material rigidly secured in said hub and connected at their free ends by swinging links or equivalent attachments to the felly or rim of the wheel.

Like characters represent like parts in all the figures of the drawings.

Figure 2:
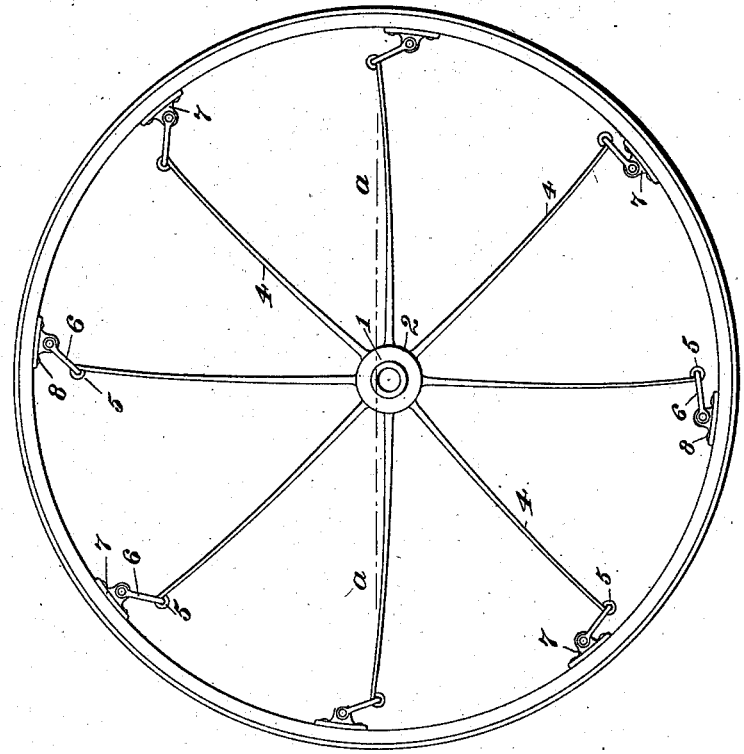
Figure 1:
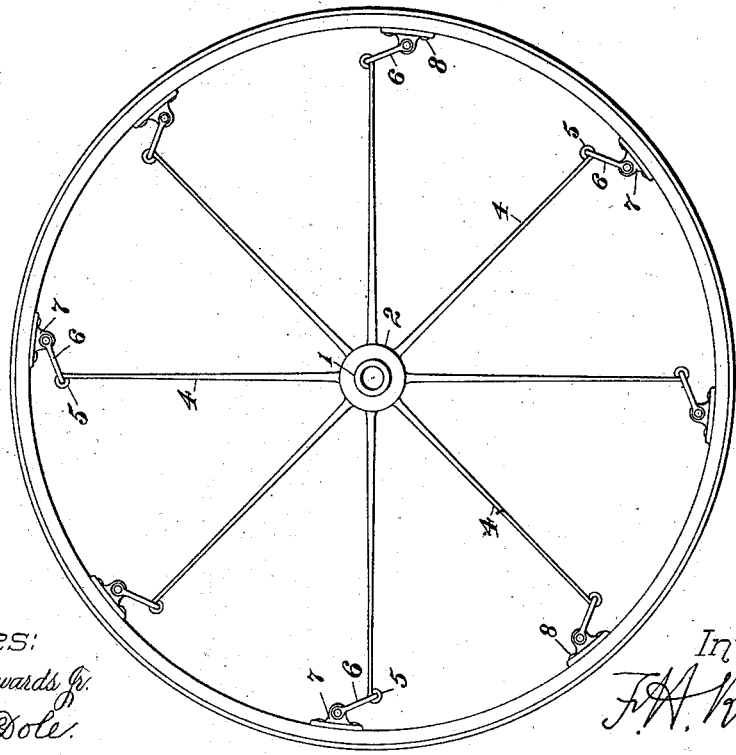

In the drawings accompanying and forming part of this specification, Figure 1 is a side elevation of my improved wheel in its normal position. Fig. 2 is a view similar to Fig. 1, representing the same with the spokes deflected or under tension due to strain upon the hub. Fig. 3 is a detail view of the hub, showing one spoke in position therein and connected to a section of the felly or rim. Fig. 4 is a section on line $a\,a$, Fig. 3. Fig. 5 is a transverse section of the hub and spokes on line $b\,b$, Fig. 4; and Figs. 6 to 10, inclusive, are detail views hereinafter referred to.

The hub 1, which is preferably a metallic hub, has the usual bore for the axle and is provided with an enlarged thickened portion 2, surrounding the bore. Located at intervals in the portion 2 are a series of recesses or pockets 3, in which the thickened butt-ends of the spokes are placed and rigidly secured, as will be hereinafter described.

4 represents the spokes, which are preferably formed of metal, of the shape shown in cross-section in Fig. 7. Each spoke gradually tapers, both in width and in thickness, from the lower to the upper end, where it is formed into a hook or eye 5, for a purpose hereinafter mentioned.

6 represents stirrups or links (shown as preferably pivotally connected to blocks 7) rigidly secured to the under side of the felly by the usual tire-bolts 8, or they may be fastened in place in any other approved or well-known manner.

It will be observed that the lower thickened ends of the spokes are of dovetailed or tapered form, as shown at 4', and that the spokes are formed of resilient material, having two rounded or headed edges and an intervening flat web, whereby great strength is obtained as well as sufficient resiliency or elasticity, due to the tapering form, under strain. It will also be observed that the links or stirrups 6 assume an inclined or angular relation to the felly when the parts are assembled and are in their normal positions, as shown in Fig. 1, and that when strain or weight is brought upon the hub the flexure of the spokes, which in the rotation of the wheel are at that time below the hub or beneath the dotted line $a\,a$, Fig. 2, will be practically uniform, and that when such strain is removed they will spring back to their original positions, being guided and controlled in both instances by the swinging links aforesaid.

When under strain or weight, the series of links or spokes above the hub act yieldingly to support and sustain the hub and lower series of spokes against undue flexure, and all of the spokes mutually serve to support each other and to bear the weight of the vehicle in a yielding manner.

When the hub is pressed down below a line drawn through its axis when in normal position—for instance, dotted line $a\,a$, Fig. 2—the spokes will be deflected or curved, as shown, and the lower series of links will lie substantially parallel to a line tangential to the inner surface of the felly, while the intermediate and upper series will assume various inclined relations to the under surface of said felly. When the weight or depressing influence is removed, the spokes and links will immediately resume their respective normal radial and inclined positions with relation to the hub and felly.

As a preferable manner of securing the spokes in the sockets or recesses 3 of the hub, I indent, swage, or compress the substance of the body thereof, as at 9, Fig. 5, and therefore crowd or displace the metal against the thickened ends of said spokes, whereby they are rigidly secured in position.

By employing a wheel of the character above described I am enabled to dispense with the springs ordinarily employed, and all jars or jolts due to the passage over uneven roads will be relieved and taken up, and the vehicle will run much more steadily and evenly and with comfort to the occupants thereof.

The parts of my improved wheel are readily assembled by placing the spokes *in situ* in the recesses of the hub and securing them in place in the manner above described. The felly and tire, with attached stirrups, are then placed over the spokes and the hooks are connected to the stirrups and seated thereon.

It is obvious that the spokes can be secured to the hub in various ways other than that shown, and that the hub and spokes can be made of various materials suitable for the purpose.

Having thus described my invention, what I claim is—

1. A vehicle-wheel comprising a hub and felly; and a series of resilient spokes connected to the felly by normally-inclined swinging links or stirrups each of said links or stirrups having a journal connection with both the spoke and the felly.

2. A vehicle-wheel comprising a hub and resilient spokes; a felly; blocks secured to the under side of the felly; and normally-inclined swinging links pivotally connected to the blocks and spokes.

3. A spring-wheel comprising a hub, a series of resilient spokes, and a felly; blocks secured to the under side of the felly; and swinging stirrups or links having cross-bars pivotally connected to the blocks and to the ends of the spokes.

4. A spring-wheel comprising a felly, a hub, and a series of resilient spokes seated in said hub and attached to the felly by swinging connections, each of said spokes consisting of a bar tapering in width and depth throughout its length and having a flat web and thickened edges.

5. A spoke consisting of a bar tapering longitudinally in width and depth, and having a flat web and thickened edges, and also having a thickened portion at its lower end of dovetail shape in cross-section.

FRANCIS H. RICHARDS.

Witnesses:
HENRY BISSELL,
EMMA G. FOWLER.